United States Patent [19]
Lenthall et al.

[11] Patent Number: 5,202,999
[45] Date of Patent: Apr. 13, 1993

[54] ACCESS REQUEST PRIORITIZATION AND SUMMARY DEVICE

[75] Inventors: John M. Lenthall, Galway, Ireland; Neal A. Crook, Reading, England; Helen C. McGreal, Galway, Ireland; Michael J. Seaman, San Jose, Calif.

[73] Assignee: Digital Equipment Corporation, Maynard, Mass.

[21] Appl. No.: 819,186

[22] Filed: Jan. 10, 1992

[51] Int. Cl.5 .............................................. G06F 13/37
[52] U.S. Cl. .................................. 395/725; 364/242.6; 364/241.2; 364/DIG. 1; 364/941.91; 364/DIG. 2
[58] Field of Search .......... 364/DIG. 200, DIG. 900, 364/200, 900; 395/725, 775, 325

[56] References Cited

U.S. PATENT DOCUMENTS

| | | | |
|---|---|---|---|
| 3,599,162 | 8/1971 | Byrns | 340/172.5 |
| 4,148,011 | 4/1979 | McLagan et al. | 340/147 |
| 4,326,249 | 4/1982 | Godsey | 395/275 |
| 4,365,294 | 12/1982 | Stokken | 395/325 |
| 4,380,052 | 4/1983 | Shima | 395/325 |
| 4,621,342 | 11/1986 | Capizzi et al. | 395/325 |
| 4,630,041 | 12/1986 | Casamatta et al. | 340/825.5 |
| 4,660,169 | 4/1987 | Norgen et al. | 395/325 |

OTHER PUBLICATIONS

Mano, "Computer System Architecture", 2nd ed., 1982, pp. 434-437.

*Primary Examiner*—Robert L. Richardson
*Assistant Examiner*—Lance L. Barry
*Attorney, Agent, or Firm*—Kenyon & Kenyon

[57] ABSTRACT

An access request prioritization and summary device for determining the current highest priority among n entities. The device includes a bitmap having n bit storage locations. Each one of the n bit storage locations corresponds to one of the entities and is used to store a value which represents when the corresponding entity is available for prioritization. A plurality of combinational logic blocks are connected to the bitmap so that each one of the combinational logic blocks receives a preselected portion of the values stored in the n bit storage locations of the bitmap. Each one of the combinational logic blocks has a token signal input and a token signal output. The token signal inputs and outputs are coupled together to form a series of token signal links between the combinational logic blocks. When certain preselected highest priority determination conditions occur within one of the combinational logic blocks, the combinational logic block generates a token signal which serves as the token signal to the respective succeeding combinational logic block. Each combinational logic block is capable of receiving a token signal from the previous combinational logic block and is responsive to the input of a token signal to determine a current highest priority from the values which it received as input signals.

14 Claims, 3 Drawing Sheets

ACCESS REQUEST PRIORITIZATION AND SUMMARY DEVICE

FIELD OF THE INVENTION

The present invention is directed to resource allocation in a computer system and, more particularly, to an apparatus for monitoring an area of memory in order to maintain a history of resource requests which are written by external entities to allocated areas of memory, assigning a priority to the requests, and then maintaining a summary register which can be read by a local processing entity in order to determine the order in which to process the requests fairly.

BACKGROUND OF THE INVENTION

In modern computer design, resources provided in a computer system are shared among several processing devices for efficient performance. Each resource can comprise, e.g., a processor configured to perform preselected operations or processing services for the other processing devices of the system. Whenever a resource is provided in a computer system, fairness becomes a design issue. Fairness concerns the fair allocation of the services provided by the resource among the processing devices that utilize the resource. It is typically a design criteria in the implementation of a resource that no one processing device so dominate the use of the resource that other processing devices of the computer system are unable to receive adequate service from the resource.

In one scheme for interlocking processing devices to a shared resource, such as a C.P.U., a plurality of storage devices, such as, e.g., ring buffers, is provided. Each processing device of the system that utilizes a particular resource is allocated to one or more of the ring buffers. In this manner, each processing device can write into addressable locations within an allocated ring buffer, requests for use of the resource and other information that may be required by the resource for the performance of its service. The resource operates to poll the addressable locations of the ring buffers, to read and process the requests and other information stored in the ring buffers.

In order to reduce polling required by the local resource, it is possible to maintain a summary register which can be subsequently read by the local resource in order to determine the order in which to process the requests fairly.

A known method for reading and processing such requests would be to maintain a bitmap in a register, where each bit position corresponds to an area of the memory associated with a single ring buffer. A write to a ring buffer would cause the corresponding bit in the bitmap to be set. The local resource, e.g. a processor, would be provided with a mechanism for clearing down a bit once it had been set and after the ring buffer had been polled for outstanding requests. Software could than be used to parse the bitmap. However, this approach has the distinct disadvantage of being slow and inefficient when the bitmap is being parsed under software control.

SUMMARY OF THE INVENTION

The present invention provides an apparatus for a fair and time efficient mechanism for monitoring processor requests and maintaining a 'summary register' which indicates to a resource the order in which to service the requests fairly.

Several processors write resource requests to ring buffers in a common block of memory. A bitmap is then maintained with each bit in the bitmap representing a ring buffer which may contain a resource request. When a resource request is written to one of the ring buffers, a corresponding bit is set in the bitmap to indicate that the resource request was made by a particular processor. When the resource request is serviced, the corresponding bit in the bitmap is cleared.

The apparatus of the present invention provides a mechanism for assigning the resource requests priority using a round robin scheme which is implemented in hardware. The apparatus of the present invention monitors the bitmap and determines the priority of the requests represented by bits in the bitmap. Priority determinations are made through the use of a series of combinational logic blocks with each block parsing a preselected portion, e.g., eight bits of the bitmap. The result is stored in a summary register which may be read by the resource to determine which request should be serviced next. After the resource reads the result stored in the summary register, the resource asserts a read signal which is used to clear the summary register.

The combinational logic blocks are coupled together by a token passing scheme to parse the entire bitmap which may be of any size. The token passing is utilized to transfer authority to parse the preselected portion of the bitmap allocated to a particular combinational logic block with the token being passed to another block by the particular combinational logic block upon the occurrence of certain current highest priority determination conditions. For example, the particular combinational logic block can pass the token when there are no outstanding requests indicated in its portion of the bitmap.

Each combinational logic block requires only a single clock cycle to process, e.g., the eight bits which it is assigned from the bitmap. In accordance with the present invention, additional logic blocks may be added easily and in such a manner so that any number of ring buffers or requests may be serviced requiring only one additional clock cycle to service each additional set of ring buffers added to the system.

This approach has the distinct advantage of simplicity even when used to handle a large number of ring buffers as opposed to a system implementing the parsing of the bitmap in a single unified piece of combinational logic.

For example, an apparatus according to the present invention for handling 32 ring buffers designed to implement the method of the present invention could comprise a thirty-two bit bitmap and 4 combinational logic blocks requiring a maximum of only four clock cycles to parse the entire bitmap and assign a priority to the resource requests. An apparatus with 64 ring buffers could have a 64 bit bitmap, eight logic blocks and require a maximum of eight clock cycles to determine the priority of the service requests, with a single clock cycle being required by each logic block.

Alternatively, each logic block may be designed to process an n number of bits, e.g. 16 bits, which are assigned from the bitmap. By changing the number of bits a logic block can parse, any number of ring buffers or requests may be serviced with no increase in the number of clock cycles being required to parse the bitmap. This result is possible since the time required to parse the full bitmap depends on the number of logic blocks and not the number of bits being parsed by a particular logic block.

The present invention has the advantage of requiring significantly less time to poll the rings as compared to a conventional software implementation. Furthermore in a given system, the number of rings available is determined by the maximum configuration of the system, and in any particular system, a number of the rings would actually be unused. In a conventional system implemented using software to parse the bitmap, it is necessary for the resource to keep track of the rings which are not being used. However, the present invention's hardware implementation scheme has the advantage of not requiring the resource to store information about which rings are active in a system and which are not.

DETAILED DESCRIPTION

Figure 1:
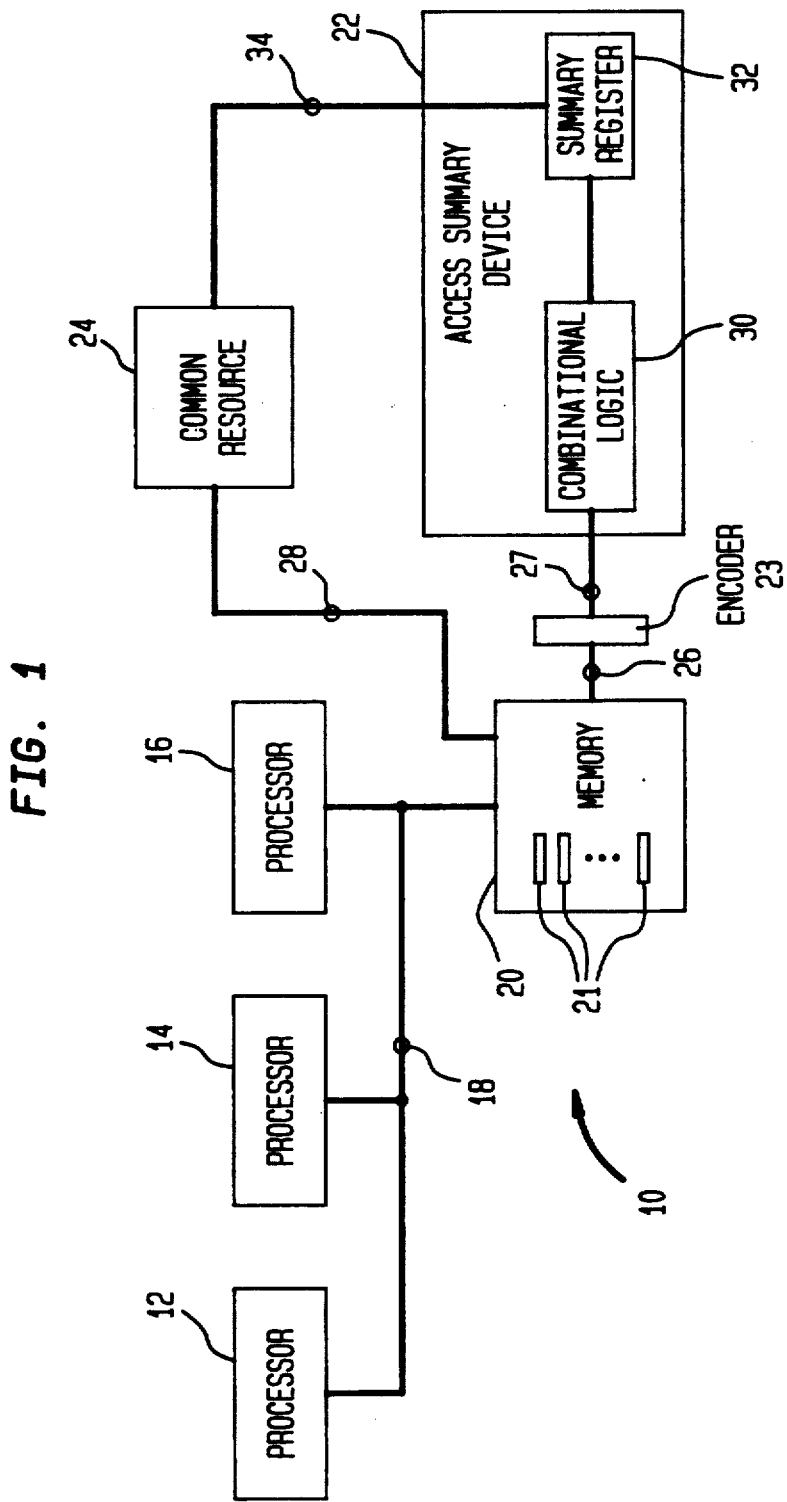
FIG. 1 is a block diagram of a computer system wherein a plurality of processors share a common resource.

Referring now to the drawings, and initially to FIG. 1, there is illustrated a computer system generally indicated by the reference numeral 10. The computer system 10 comprises a plurality of processors 12, 14, 16 which are coupled to a common memory unit 20 by a bus 18. The common memory unit 20, which may comprise a block of RAM, is in turn coupled to an access summary device 22 used to store requests to a common resource 24. For example, the memory RAM can be divided into 32 ring buffers 21 with each ring buffer being allocated to one of the processors 12, 14, 16 for storing requests to the common resource 24. The common memory unit 20 is in turn coupled to an encoder 23 by an access event bus 26 and to the common resource 24 by a bus 28. The common resource 24 may comprise, e.g. a processor configured to perform preselected operations or processing services for the other processing devices of the system.

The output of the encoder 23 is coupled by an encoded access event bus 27 to an access summary device 22. The access summary device 22 is in turn coupled to the common resource 24, by a bus 34. The access summary device 22 may comprise, e.g. a block of combinational logic 30, and a summary register 32. The block of combinational logic 30 determines the priority of the resource requests, from the requests made by the processors 12, 14, 16 in the common memory 20. The summary register 32 stores a value which indicates that a resource request has occurred and, furthermore, which ring buffer of the memory 20 has been assigned the highest priority by the combinational logic block 30 indicating that it should be serviced next by the common resource 24.

The common resource 24 can read the summary register 32 via the bus 34 to determine which ring buffer was assigned the highest priority by the access summary device 22 and should be serviced next. After reading the summary register 32 the common resource 24 asserts a read signal which enables the clear input of the summary register 32. The common resource 24, which has access to the common memory unit 20 through bus 28, can then proceed to access the selected ring buffer of the common memory unit 20.

Figure 2:
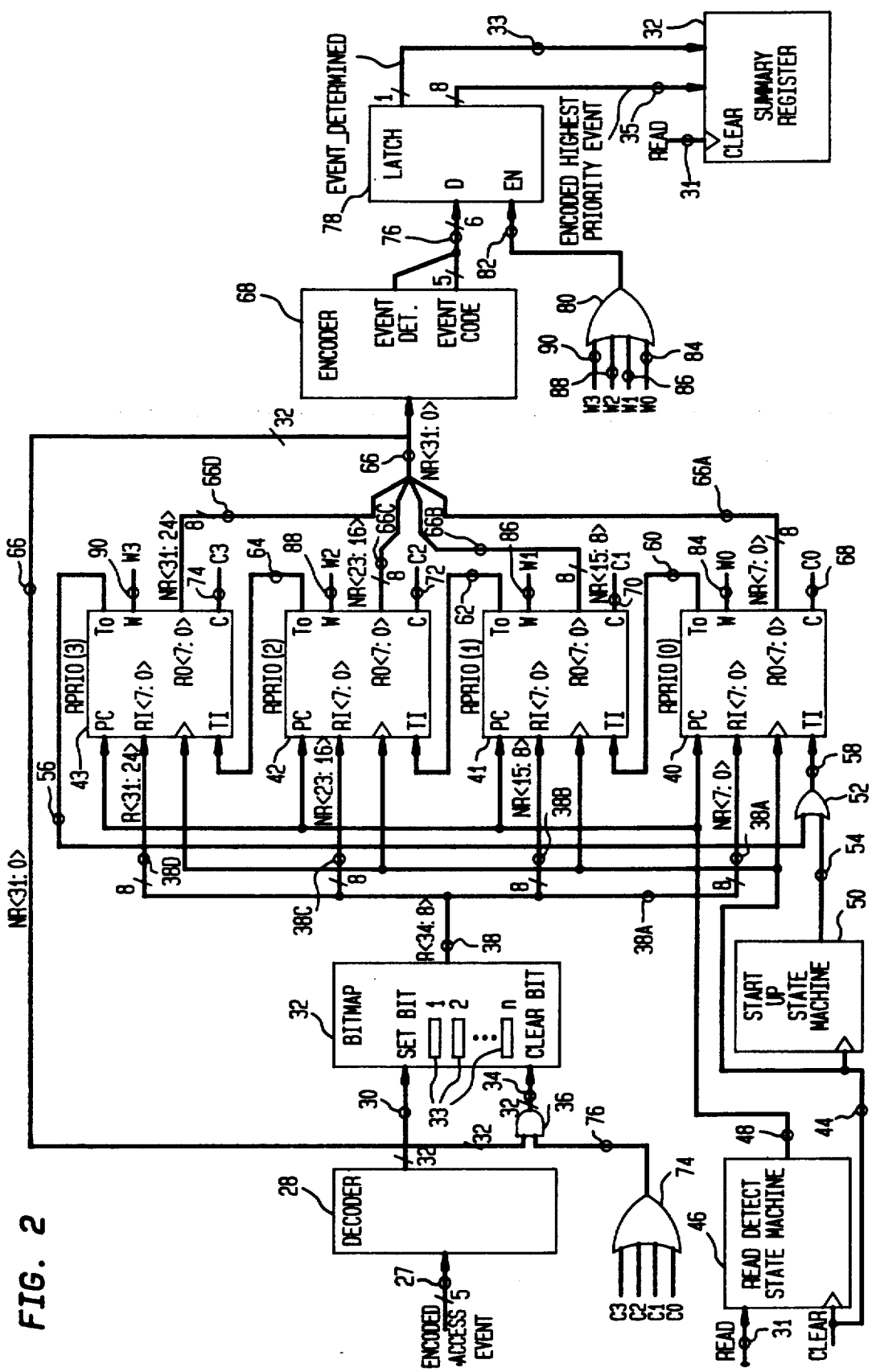
FIG. 2 is a block diagram of the access summary device of FIG. 1, according to the present invention.

FIG. 2 illustrates the access summary device 22 of FIG. 1 in greater detail. The access summary device 22 comprises a decoder 28 which has its input coupled to the five bit encoded access event bus 27. The encoded access event bus 27 is coupled to an encoder 23, which monitors the common memory unit 20 via the access event bus 26 to determine when requests have been written to the ring buffers in the common memory unit 20. The encoder 23 supplies a five bit encoded access event signal to the decoder 28 as an input signal by means of the bus 27. The encoded access event signal serves to indicate that one of the ring buffers to the memory 20 has been written to and provides a number value indicating the particular ring buffer that was accessed.

The decoder 28 decodes the five bit access event signal into a 32 bit set-bit signal, with each bit in the set-bit signal representing one of the ring buffers. Only one bit of the set-bit signal may be high at any one time, with the high bit indicating which particular ring buffer was written to. The output of the decoder 28 is coupled by a thirty-two bit bus 30 to a set input of a thirty-two bit logic array referred to as a bitmap 32. Accordingly, each bit in the thirty-two bit logic array referred to as the bitmap 32 comprises one of n one bit storage locations 33. A high bit in the decoder output signal set-bit, will have the effect of setting the corresponding bit in the thirty-two bit array, bitmap 32. Thus, at any given time, there may be a number of bits set in the bitmap 32 one for each request indicated by a series of access events. A clear input to the bitmap 32 is supplied by a thirty-two bit line 34. Line 34 couples the output of a logic device 36 to the second input of the bitmap 32. The logic device 36 is representative of an array of 32 AND gates with each AND gate having the clear signal output by the OR gate 74 as one input and a respective bit of the signal NR<31:0> as an input. The output of the logic device 36 is a 32 bit clear-bit signal input to the bitmap 32. A high bit in the 32 bit clear-bit signal will serve to clear the corresponding bit in the bitmap 32 as will be described below.

The output of bitmap 32 is coupled to a thirty-two bit bus 38 which splits into four eight bit busses 38A through 38D. Each 8 bit bus 38A through 38D is in turn, coupled to a first input of a corresponding first through fourth request priority logic block RPRIO(0) through RPRIO(3) 40-43. The request priority logic blocks RPRIO(0) through RPRIO(3) 40-43 together perform an evaluation between the most recently read bitmap output signal R<31:0> from the bus 38, which indicates the current requests for priority, and the previously determined priority request represented by a next request output signal NR<31:0>, determined by the RPRIO logic blocks 40-43 in a previous cycle of operation. Thus, the bus 38 divides the 32 bit bitmap output signal R<31:0>, which represents the resource request stored in the bitmap 32, into four 8 bit signals R<7:0>, R<15:8>, R<23:24> and R<31:14>. Each of the 8 bit signals serves as a one byte input signal to a corresponding RPRIO logic block. The first logic block RPRIO(0) 40 has the lowest 8 bits R<7:0> of the bitmap output signal as a resource request input signal RI<7:0>. The second logic block RPRIO(1) 41 has the next highest 8 bits R<15:8>, of the bitmap output signal R<31:0>, as a resource request input signal RI<15:8>. The third logic block RPRIO(2) 42, in turn, has a resource request input signal RI<23:16> which consists of bits 23 through 16 R<23:16> of the bitmap output signal R<31:0>. Finally, the fourth logic block RPRIO(3) 43 has the highest 8 bits R<31:24> of the bitmap output signal R<31:0> as a resource request input signal RI<31:24>.

In addition to the resource request input signals RI, each RPRIO logic block 40–43 is supplied with a common clock signal, by a line 44, which couples the second input of each RPRIO logic block 40 through 43 to the output of a system clock (not illustrated). A third input of each of the RPRIO logic blocks 40–43 is coupled to the output of a read detect state machine 46 by a line 48. The read detect state machine 46 provides a priority clear or PC output signal which indicates that the common resource 24 has read the summary register 32. The priority clear, PC signal indicates that a new priority request must be determined.

The read detect state machine 46, which generates the priority clear PC signal has both a system clock signal and the read signal as inputs. The read signal, which indicates that the common resource 24 has read the summary register 32, is supplied to the first input of the read detect state machine 46 by the common resource 24, whenever it reads from the summary register 32. The system clock signal is supplied to the second input of the read detect state machine 46, by the line 44. The line 44 is also coupled to a clock input of a start-up state machine 50.

The start up state machine 50, serves to put the access summary device 22 into a known good state when the system is powered up or reset. The output of the start up state machine 50 is coupled to a first input of an OR gate 52 by a line 54. The second input of the OR gate 52 is coupled to a first output of the fourth request priority logic block RPRIO(3) 43 by a line 56. Thus, the OR gate 52 has both the output signal from the start up state machine 50 and a token-out, TO signal from logic block RPRIO(3) 43 as inputs. The output of the OR gate 52 is coupled to the fourth input of logic block RPRIO(0) 40 by a line 58. Thus, a token-in-in, TI, signal output by the OR gate 52, serves as the fourth input signal to logic block RPRIO(0) 40.

The request priority logic blocks RPRIO(0) through RPRIO(3) 40–43, each have four output signals, a token-out signal, TO, a new result signal W, a next request signal NR, and a clear request signal C. The token-out signal TO from the first output of each of the RPRIO logic blocks RPRIO(0) through RPRIO(3) 40–43 serves as the token-in input signal for the next RPRIO logic block in the sequence. The second output of each RPRIO logic block is the new result signal W, which indicates that a new request has been assigned the highest priority by the respective RPRIO logic block and should be serviced next. The third output of each of the RPRIO logic blocks is an eight bit next request signal, NR. The next request signals NR, are combined into a thirty-two bit signal NR<31:0> which indicates the next request which should be serviced. The fourth output of each of the RPRIO logic blocks is the clear bit signal C which is used to clear from the bitmap 32 the bit for the ring buffer which has been assigned the highest priority and which is to be serviced next.

The lowest RPRIO logic block RPRIO(0) 40 has its fourth input coupled to the OR gate 52 by the line 58. The OR gate 52 has, in turn, both the first output signal of RPRIO(3) 43, TO, and the output of the start-up state machine 50 as inputs. In this manner, the token-in signal TI, supplied to the fourth input of logic block RPRIO(0) 40, can be supplied by either the start up state machine 50 or wrap around from the first output of the last logic block RPRIO(3) 43.

The first output of the first logic block RPRIO(0) 40 is in turn coupled to the fourth input of the second RPRIO logic block 42 by a line 60. Thus, the token-out, TO, signal from logic block RPRIO(0) 40 serves as the token-in signal supplied to logic block RPRIO(1) 41. The first output of logic block RPRIO(1) 41, is coupled to the fourth input of logic block RPRIO(2) 42 by a line 62. Thus, the token-out signal of logic block RPRIO(1) 41 is supplied as the token-in signal to the fourth input of logic block RPRIO(2) 42. Following this sequence, the first output of logic block RPRIO(2) 42 is coupled by a line 64 to the fourth input of logic block RPRIO(3) 43. The line 64 therefore supplies the token-out signal from logic block RPRIO(2) 42 as the token-in signal of logic block RPRIO(3) 43. As noted earlier, the token-out signal of logic block RPRIO(3) is supplied to an OR gate 52, which generates the token-in signal to logic block RPRIO(0) 40 thus creating a closed loop between the RPRIO logic blocks 40–43 around which token signals may pass.

In this manner, the token-in and token-out signals provide a means of communicating between the individual RPRIO logic blocks 40–43 which form the closed loop. The rippling of the token signals through the RPRIO logic blocks, serves as an indication to each individual logic block whether it may select the next request priority signal or whether that is the function of one of the other RPRIO logic blocks at any given time.

The third outputs of the individual RPRIO logic blocks 40–43 are coupled, by four eight bit sections 66A through 66D of a thirty two bit bus 66, to the input of an encoder 68 and the input of the logic device 36. Thus, each RPRIO logic block 40–43 supplies a byte of the total thirty-two bit next request signal NR<31:0>, which indicates which of the thirty two ring buffers contains the request which is to be serviced next. The third output of logic block RPRIO(0) 40 supplies the next request output signal NR<7:0> to the bus 66A forming the lowest eight bits of the thirty-two bit signal NR<31:0> which is found on the bus 66. The third output of the logic block RPRIO(1) 41 supplies the next request output signal NR<15:8> to the bus 66B forming the second byte of the thirty-two bit signal NR<31:0>. The third byte NR<23:15> of the next request output signal NR<31:0> is supplied by the third output of the third logic block RPRIO(2) 42 to the bus 66C. The remaining byte NR<31:24> of the next request signal NR<31:0> is supplied to the bus 66D by the third output of the fourth logic block RPRIO(3).

The fourth output of each of the RPRIO logic blocks RPRIO(0) through RPRIO(3) 40–43 is coupled by an individual line 68, 70, 72 or 74, to the respective first through fourth inputs of an OR gate 74. Thus, the OR gate 74, has the four clear request signals C0, C1, C2, and C3, output by the fourth output of each of the respective RPRIO logic blocks 40–43, as input signals. The output of the OR gate 74 is coupled to an input of the logic device 36 by a line 76.

The output of the logic device 36 is a thirty-two bit clear bit signal which corresponds to the next request signal NR<31:0>. The 32 bit output of the logic device 36 is coupled by the bus 34 to the clear input of the bitmap 32. A bit in the clear bit signal is asserted when one of the clear request signals from the RPRIO logic blocks 40-43 is asserted and there is a bit set in the next request signal NR<31:0>. The next request to be serviced which is indicated by NR<31:0> will be used in combination with the clear request signals C0, C1, C2 and C3 to clear down the appropriate bit in the bitmap 32.

The bus 66 is coupled to the input of an encoder 68 and supplies the next request signal NR<31:0> as an input signal to the encoder 68. The next request signal NR<31:0> is a value which indicates which of the thirty-two ring buffers contains the request to be serviced next. Thus, only one bit in the next request signal NR<31:0> will be set at any given time. The next request signal NR<31:0> is encoded in the encoder 68 from a thirty-two bit signal to a five bit signal referred to as the event code. The five bits will comprise a value representative of the next ring buffer to be polled by the resource 24. The encoder 68 also generates a one bit signal referred to as event detect signal which indicates that a resource request was actually written to one of the ring buffers in memory. If no resource request occurred, and thus none of the bits in the next request signal NR<32:0> were set, the event detect signal will be low. However, if a resource request occurred, the signal event detect will be high. The signal event detect serves as a sixth bit to indicate the difference between when no request was made, which is indicated by the event determined signal being low and all five bits of the event code being low, and when ring buffer zero contains a request and has been assigned the highest priority as indicated by a high event determined bit and all five bits of the event code being low.

The output of the encoder 68 is a six bit signal comprising the encoded five bit event code and the one bit event detect signal. The output of the encoder 68 is coupled by a six bit bus 76 to an input of a latch 78 which therefore has the event code signal and event detect signal as inputs. An enable input of the latch 78 is coupled by a line 82 to the output of an OR gate 80. The OR gate 80 has its four inputs coupled by lines 84, 86, 88 and 90 to the second outputs of the respective RPRIO logic blocks RPRIO(0) through RPRIO(3) 40-43. The second outputs of the RPRIO logic block 40-43 supply the new result signals W0, W1, W2 and W3, which indicate a new result and which block is responsible for the new next request signal. The new result signals serve as inputs to the OR gate 80. Only one of the four signals W0, W1, W2, or W3 may be high at any given time. The output of the OR gate 80 is supplied as an input signal to the latch enable input of the latch 78, by the line 82. Thus, the signal from the OR gate 80 which indicates a new result enables the latch 78 to load the summary register 32, via a line 33 and a bus 35, with the six bit signal provided by the encoder 68.

The latch 78 has two output signals which are supplied to the summary register 32. The first output of the latch 78 is the one bit event determined signal while the second output of the latch 78 is the five bit event code signal which indicates which ring buffer has been assigned the highest priority and should be serviced next. Thus, the common resource can read the summary register 32 to determine if a request must be serviced and which ring buffer is to be polled next.

Figure 3:
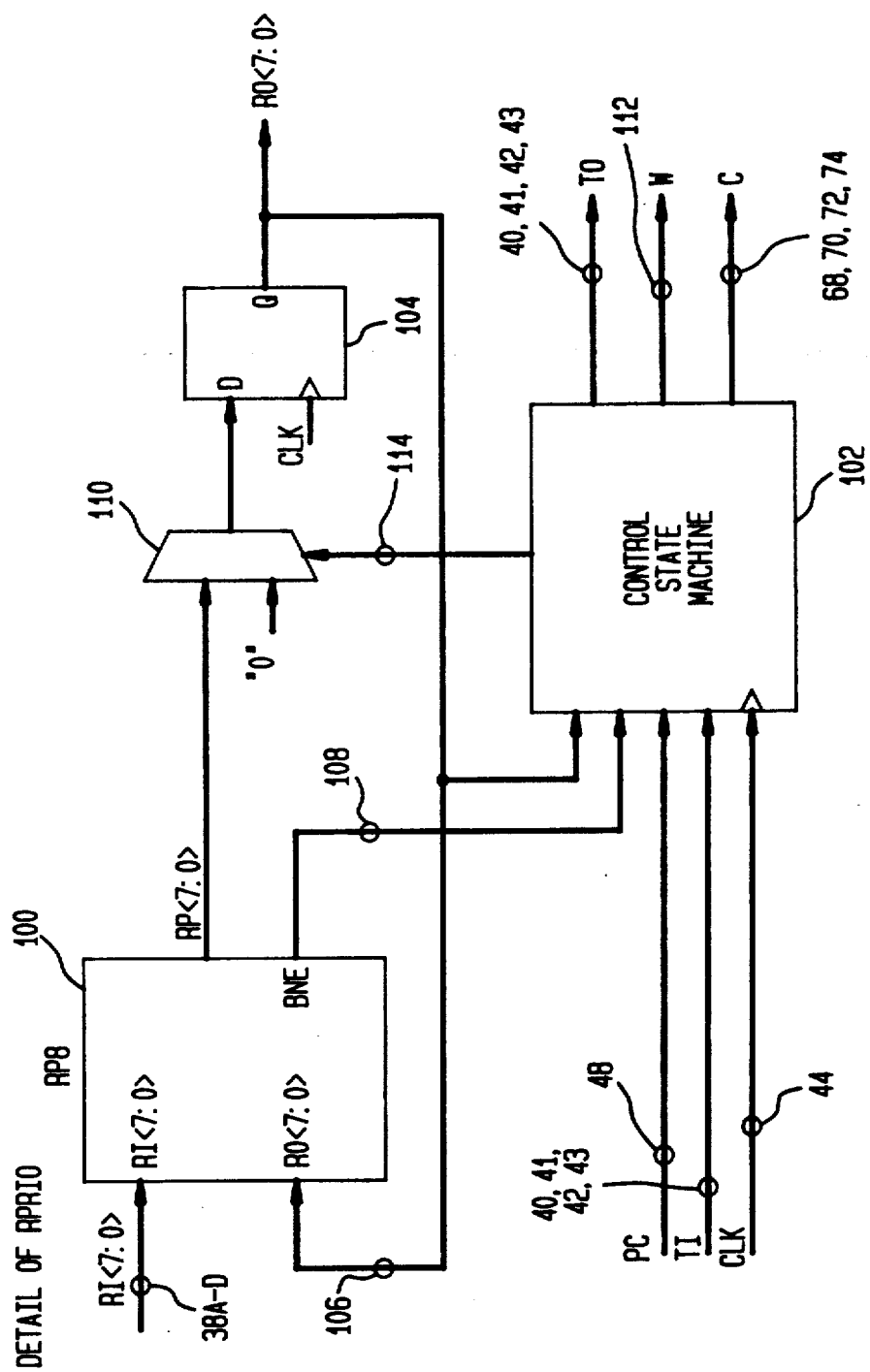
FIG. 3 illustrates a more detailed schematic block diagram of one of the request priority logic blocks, RPRIO of FIG. 2.

Referring now to FIG. 3, the request priority logic blocks RPRIO 40-43 of FIG. 2, are illustrated in greater detail As explained above, each RPRIO logic block RPRIO(0) through RPRIO(3) 40-43 is supplied with one byte of the thirty-two bit request signal R<31:0>. The RPRIO logic blocks 40-43 proceed to process their assigned eight bit portion of the request signal R<31:0> to determine which request is to be assigned the highest priority. The passing of a token from RPRIO block to RPRIO block in a sequential manner, provides each RPRIO block 40-43 with the ability to determine if the next request signal is to be generated from within its eight bit segment of the request signal or whether another RPRIO block has been assigned the task of determining the next request output signal. The use of four eight bit RPRIO logic blocks 40-43 in this manner, provides an easy to implement and expandable mechanism for determining the next priority signal as opposed to using a single thirty-two bit combinational logic block to determine the request signal with the highest priority. Since each of the RPRIO logic blocks 40-43 provide an eight bit portion of the thirty-two bit next request signal NR<31:0>, only one RPRIO logic block 40, 41, 42 or 43 may output a next request signal RO<7:0> with a high bit at any given time. The passing of the token, and the presence of the most recent request signal RO<7:0> which is also the output signal, provides each RPRIO logic block with the necessary information for the block to determine if it has the authority to determine the next request priority.

The first input of the RPRIO logic block is supplied with an eight bit portion of the request signal R<31:0> as a request-in signal RI<7:0>. The eight bit request-in signal RI<7:0>, supplied by bus 38A, 38B, 38C or 38D, serves as the first input into an eight bit combinational logic block RP8 100 contained within each RPRIO logic block.

The second input, into each RPRIO logic block 40-43, is supplied with the system clock signal. The system clock signal is thus supplied to a first input of a control state machine 102 and a D-type flip-flop 104 contained within the RPRIO logic block.

The control state machine 102 has a total of five inputs. The third input to each of the RPRIO logic blocks 40-43 is coupled to a second input of the control state machine 102 by the line 42. The line 42 which is also coupled to the output of the read detect state machine 46 supplies the priority clear PC signal as the second input signal to the control state machine 102. The PC signal indicates that the common resource 24 has read the summary register 32.

The fourth input of each of the RPRIO blocks 40-43 is coupled to the fourth output of the preceding RPRIO block. In this manner, the token-in signal TI to each RPRIO block is supplied by the token-out TO signal of the preceding block with the TO signal from the last RPRIO block wrapping around to serve as the TI signal supplied to the first RPRIO block. The fourth input to each RPRIO block is coupled to the third input of the control state machine 102 which is contained within the RPRIO logic block. Thus, the third input to each of the state machines 102 is the token-in signal TI.

The fourth and fifth inputs to the control state machine 102 are generated within the individual RPRIO logic block.

The fourth input to the control state machine 102 is coupled to the first output of the combinational logic block RP8 100. The first output of the logic block RP8 100 supplies a signal BNE, which symbolically stands for bitmap not equal to zero, to the fourth input of the control state machine 102. The signal BNE indicates that the eight bit portion of the bitmap 32, associated with the particular RPRIO logic block, and represented within the RPRIO logic block by the request-in signal RI<7:0>, has at least one bit set indicating a service request. Thus, when the BNE signal is high, a service request exists.

The signal BNE, which is the fourth input signal to the control state machine 102, is used to determine when the control state machine 102 should send out a token, TO. When the signal BNE is low, and thus there are no requests present within the eight bit portion of the bitmap represented by the signal RI<7:0>, the control state machine 102 will send out a token TO if the previous priority request RO<7:0> had a bit set indicating that the particular RPRIO block was responsible for selecting the previous priority request RO<7:0>, or if TI='1', indicating that the RPRIO block was passed authority to determine the next request priority.

The fifth input of the control state machine 102 is coupled by a line 106, to the output of a D-type flip-flop 104. The line 106 also couples the output of the D-type flip-flop 104 to a second input of the RP8 logic block 100 and the third output of the respective RPRIO block. Thus, the D-type flip-flop 104, supplies the eight bit request output signal RO<7:0> as an input signal to the fifth input of the control state machine 102 and the second input of logic block RP8. The eight bit request output signal RO<7:0> represents the request which has currently been assigned the highest priority by the RPRIO logic block. The request output signal RO<7:0>, which is supplied to the third output of the RPRIO logic block, comprises eight bits of the thirty-two bit next request signal NR<31:0>. The four eight bit RO signals, from the four RPRIO logic blocks 40-43 are supplied to the bus 66 by the eight bit lines 66A, 66B, 66C and 66D to form the full thirty-two bit signal NR<31:0>.

The control state machine 102 has a total of four outputs. The first output of the control state machine 102 serves as the fourth output of the RPRIO logic block and is coupled to one of the four lines 68, 70, 72 or 74. The first output of the control state machine 102 is a clear request signal C0, C1, C2, or C3, which controls when a bit in the bitmap 32 will be cleared. The clear request signal is supplied to the OR gate 74 located outside the RPRIO block, by one of the lines 68, 70, 72 or 74.

The second output of the control state machine 102 also serves as the second output of the RPRIO logic block and is coupled by one of the lines 84, 86, 88 or 90 to the input of the OR gate 80. In this manner, the second output of the control state machine 102 supplies the OR gate 80 with the new result signal W0, W1, W2, or W3 which corresponds to the corresponding RPRIO logic block RPRIO(0), RPRIO(1), RPRIO(2) or RPRIO(3) respectively.

The third output of the control state machine 102 is the token out signal TO which serves as the first output of the RPRIO block. The TO signal serves as the token-in TI signal to the next RPRIO block in the chain of RPRIO blocks as described previously.

The fourth output of the control state machine 102 is a control line 114, which is coupled to and serves as a select line to a MUX 110. The control line 114 provides the means by which the control state machine 102 chooses between the MUX's two input signals '0', and RP<7:0> to select the desired output of the MUX 110.

The output of the MUX 110 is coupled by means of an eight bit bus 118 to the D-type flip flop 104. The output of the D-type flip-flop 104 is the RPRIO request output signal RO<7:0> which is supplied by the line 106, as the third output of the RPRIO block and as a feedback signal to both the eight bit combinational logic unit RP8 100 and to the control state machine 102.

As previously explained, the series of RPRIO logic blocks 40-43 contained in the access summary device 22 operate as a group to determine the 32 bit next request signal NR<31:0> with each RPRIO block responsible for one byte of the thirty-two bit signal. Following is an explanation of how the individual RPRIO blocks work individually and together to determine the next request signal NR<31:0>.

First, each RPRIO block 40, 41, 42 or 43 must determine if it has authority to assign the next request priority. If the RPRIO block has such authority, it alone can output an RO signal with a set bit while the outputs of all the other RPRIO blocks must be low. Authority to determine the next request priority is determined by the control state machine 102.

The control state machine 102 determines if the particular RPRIO block has authority to determine the next request priority by checking if RO<7:0>, which represents the current priority, has a bit set. As described above, the RO signal of the respective RPRIO logic block is feed back to the control state machine 102. If a bit is set in RO<7:0>, it indicates that this particular RPRIO block was responsible for determining the current priority and that it has the authority to determine the next request priority.

The RP8 logic block 102 generates the signal BNE and the request priority signal RP<7:0>. The signal BNE is used by the control state machine 102 in determining when it should send out a token and which signal it should select as the output of the MUX 110. The signal RP<7:0> is the output of the RP8 logic block 102. The signal RP<7:0> controls what the next request priority will be if that particular RPRIO block has the authority to determine the next request priority.

The combinational logic block RP8 100 of each of the RPRIO logic blocks functions by determining if there is a more significant bit set in the request-in RI<7:0> signal than is set in the RO<7:0> signal. The logic block RP8 100 does this by finding the first bit position set to '1' in the request out signal RO<7:0> which indicates the current priority. As detailed above, the RO signal of the respective RPRIO block is feed back to the RP8 logic block 100. The RP8 logic block 100 then tests for the first bit set in RI<7:0> above the bit position set in RO<7:0>. The position of the higher bit in RI<7:0> is determined and the corresponding bit in the request priority signal RP<7:0> is set to '1' and all other bits in RP<7:0> are set to 0. The signal BNE is also set to '1' indicating that no token should be sent out and that the control state machine 102 should select the request priority signal RP<7:0> as the output of the MUX 110.

If there are no bits set in RO<7:0>, the combinational logic block RP8 100 determines the first bit position set to '1' in the request in signal RI<7:0> and then the corresponding bit in the request priority signal RP<7:0> is set to '1'. All other bits in RP<7:0> are set to 0. The signal BNE is also set to '1' indicating that no token should be sent out by the control state machine 102. However, when there are no bits set in RI<7:0> the combinational logic block RP8 100 sets all the bits in RP<7:0> to '0' and the signal BNE to '0' indicating to the control state machine 102 that a token should be sent out passing the authority to determine the next request priority to the next RPRIO block in the sequence of RPRIO blocks.

The control state machine 102 is responsible for determining the RPRIO logic block outputs and whether the particular RPRIO logic block has authority to determine the next request priority. The output of the MUX 110 is selected by the control state machine 102 based on the value of the signals RO<7:0> and BNE. Furthermore, the same signals RO<7:0> and BNE are used to determine when a new result signal W, clear request signal C and a token out signal TO should be asserted.

Upon receiving an asserted priority clear PC signal, the control state machine 102 proceeds to determine the outputs of the particular RPRIO logic block based on the current value of BNE it receives from the logic block RP8, the value RO<7:0> and the token-in signal TO.

The control state machine 102 has authority to determine the next request priority if it receives either a token-in signal, TI='1', or because any bit in the stored value of RO<7:0> equals '1' indicating that the particular RPRIO logic block has authority to determine the next request priority, because it determined the current priority.

There are several basic sets of conditions or cases which the control state machine 102 uses to determine the outputs of the particular RPRIO block.

In the first case, the signal RO<7:0> has a bit equal to '1' and the signal BNE output by the RP8 logic block 100 is also '1'. This indicates that the particular RPRIO logic block has authority to determine the next request priority, because it determined the current priority BNE='1' indicates there is a current request RI<7:0> within the particular RPRIO logic block which has a higher priority than the current priority. Given the stated conditions, BNE='1' and a bit in RO<7:0>='1', the control state machine selects RP<7:0> to be the output of the MUX 110. In this manner, the next request priority signal NR<31:0> is determined. The control state machine also outputs a new result signal W and clear request signal C at this time. The RPRIO block then waits for a priority clear PC signal before determining the next request priority. Since this particular RPRIO block determined the next request priority it does not assert the token out signal TO during this selection cycle.

If however, the particular RPRIO block determined the current priority indicated by RO<7:0> having a bit set, and there are no higher bits set in RI<7:0> than are set in RO<7:0>, BNE will be set to '0' by the logic block RP8 100. The control state machine 102 will send out a token, TO='1'.

Accordingly, when the value of RO<7:0> has a bit set, TI='0', and BNE='0', the control state machine 102 will select '0' as the output of the MUX 110 and output a signal TO='1' for that clock cycle indicating that it is passing authority to the next RPRIO block in the sequence to determine the next request priority. No new result signal W or clear request signal C will be asserted at this time. In the process of selecting '0' as the output of the MUX 110, the current value of the signal RO<7:0> is set to '0'.

The above case describes the situation where the particular RPRIO logic block has the authority to determine the next priority, because it determined the current priority. The token has not yet passed around the loop of logic blocks since TI=0. Furthermore, there are no higher bits set in RI<7:0> than RO<7:0> indicating that there are no requests within the particular RPRIO block to be assigned the next request priority. This condition will always result whenever the current RPRIO logic block determined the current priority, and bit seven in RO<7:0> is set. In this case, the RPRIO block sends out a token, TO=1, to pass authority to determine the next request priority to the next RPRIO block in the series of RPRIO logic blocks but doesn't assert a new result signal W since no new next request priority signal NR<31:0> was generated.

Another case of conditions occurs when RO<7:0> has no bits set but TI='1'. This indicates that the particular RPRIO block has authority to determine the next request priority because it was passed a token and not because it determined the current priority. If BNE='1', the control state machine 102 will select the signal RP<7:0> as the output of the MUX 110 and thus generate the next request priority signal NR<31:0>. At the same time, the control state machine 102 will output a new result signal W, and a clear request signal C, but no token out signal, i.e., TO='0'. The RPRIO block will then wait for a priority clear signal PC='1' before proceeding to determine the next request priority.

If RO<7:0> has no bits set, but TI=1 and BNE='0', this indicates that the RPRIO block has authority to determine the next request priority because it was passed a token-in TI='1' but that the particular RPRIO block contains no resource requests. The control state machine 102 will select '0' as the output of the MUX 110 and set the token-out signal, TO='1' for the duration of one clock cycle. In this way, authority to select the next priority request will be passed on to the next RPRIO block in the chain of RPRIO blocks. No new result signal W or clear request signal C will be asserted at that time by the current RPRIO block. In this manner, a token indicating that the particular RPRIO logic block has authority to determine the next request priority can be passed from RPRIO logic block to RPRIO logic block until one of the blocks determines a new next request priority.

Following the above logic, it is possible for a token to be passed from RPRIO block to RPRIO block or "Ripple Around" and with it the authority to determine the next request priority. It takes only one clock cycle for the token to be passed from one RPRIO block to another. Therefore, it takes a maximum of four clock cycles for the apparatus to parse the entire bitmap 32 with each RPRIO block parsing eight bits of the thirty-two bit bitmap 32.

The above approach may be extended to systems having any number of ring buffers which may be represented by bits in a bitmap. To parse a bitmap having more than thirty-two bits, additional RPRIO blocks may be added to the closed loop of RPRIO blocks or, alternatively, the number of bits each logic block parses can be increased. Each additional RPRIO block can parse an additional eight bits at an additional time cost of only one clock cycle for each RPRIO block added. For example, eight RPRIO blocks could be used to parse a 64 bit bitmap in only eight clock cycles.

What is claimed is:

1. A device for determining a current highest priority among n entities, the device comprising:
   a bitmap comprising n storage locations, each one of the n storage locations comprising a one bit storage location corresponding to one of the entities and storing a value representing when the corresponding entity is available for prioritization;
   a plurality of combinational logic blocks coupled to the bitmap so that each one of the combinational logic blocks receives as an input preselected ones of the values stored in the n storage locations of the bitmap;
   each one of the plurality of combinational logic blocks including a token signal input and a token signal output, the token signal input and the token signal output of each one of the combinational logic blocks being coupled to a token signal output of a previous one of the combinational logic blocks and to a token signal input of a succeeding one of the combinational logic blocks, respectively, to form a closed loop of token signal links between the combinational logic blocks;
   each one of the combinational logic blocks generating a token signal for input to the token signal input of the respective succeeding combinational logic block upon occurrence of preselected highest priority determination conditions within the combinational logic block;
   each one of the combinational logic blocks being responsive to reception of a token signal at the respective token signal input from the respective previous combinational logic block, to determine a current highest priority among the values input to the respective one of the combinational logic blocks as a function of the token signal,
   each one of the combinational logic blocks having an output for output of a signal representative of a current highest priority determination.

2. The device of claim 1, wherein the preselected highest priority determination conditions are when a token signal is received at the respective token signal input and when:
   i) the current highest priority determination indicates that none of the values input to the respective combinational logic block represent availability for prioritization, or
   ii) the current highest priority determination indicates that none of the values input to the respective combinational logic block that represent availability for prioritization has a priority that is higher than a value determined to have a current highest priority in a immediately preceding priority determination by the respective combinational logic block.

3. The device of claim 1, wherein the output of each combinational logic block comprises a number of bits, each one of the number of bits corresponding to one of the preselected ones of the values and being asserted only when the corresponding one of the preselected ones of the values is determined to have a current highest priority.

4. The device of claim 3, further comprising an encoder coupled to the outputs of the combinational logic blocks, the encoder being responsive to the combinational logic block outputs to generate an m bit code representative of the entity determined to have the current highest priority.

5. The device of claim 1, wherein each of the entities comprises a ring buffer.

6. The device of claim 4, further comprising a latch coupled to the output of the encoder to store the m bit code representative of the entity determined to have the current highest priority.

7. The device of claim 6, wherein each one of the combinational logic blocks further comprises means for generating a new result signal coupled to the latch, the latch being responsive to a new result signal generated by any one of the combinational logic blocks, to enable said latch to accept and store the m bit code.

8. The device of claim 7, further comprising a register coupled to the output of the latch to store the m bit code representative of the entity determined to have the current highest priority when the new result signal is asserted.

9. The device of claim 8 wherein each combinational logic block asserts the new result signal when it determines a current highest priority.

10. The device of claim 4, wherein the encoder is further responsive to the combinational logic block outputs to generate a one bit code representative of the determination of an entity selected as a current highest priority.

11. The device of claim 10, further comprising a latch coupled to the output of the encoder, to store the m bit code representative of the entity determined to have the current highest priority and the one bit code representative of the determination of an entity selected as a current highest priority.

12. The device of claim 11, further comprising a register coupled to the output of the latch to store the m bit code representative of the entity determined to have the current highest priority and the one bit code representative of the determination of an entity selected as a current highest priority.

13. The device of claim 1, wherein each one of the combinational logic blocks further comprises means for generating a clear request signal for triggering the clearing of the value in the bitmap which was assigned the highest priority.

14. The device of claim 1, wherein each one of the combinational logic blocks is responsive to reception of a priority clear signal at the respective priority clear signal input, and from a common resource, to determine when to determine a current highest priority among the values input thereto.

* * * * *